United States Patent [19]

Yamada

[11] Patent Number: 5,613,150
[45] Date of Patent: Mar. 18, 1997

[54] APPARATUS FOR PRODUCING OPERATIONAL MANUAL

[75] Inventor: Toshiaki Yamada, Yamato, Japan

[73] Assignee: Ricoh Company, Ltd., Tokyo, Japan

[21] Appl. No.: 562,715

[22] Filed: Nov. 27, 1995

Related U.S. Application Data

[63] Continuation of Ser. No. 249,695, May 31, 1994, abandoned, which is a continuation of Ser. No. 719,135, Jun. 20, 1991, abandoned.

[30] Foreign Application Priority Data

Jun. 25, 1990 [JP] Japan ................... 2-167764

[51] Int. Cl.$^6$ .................. G06F 13/00; G06F 15/00
[52] U.S. Cl. .................. 395/800; 364/222.2; 364/237.2; 364/238.5; 364/240.8; 364/241.9; 364/260.1; 364/284.2; 364/284.4; 364/286.2; 364/DIG. 1
[58] Field of Search .................. 395/200, 155, 395/159, 325, 500

[56] References Cited

U.S. PATENT DOCUMENTS

| | | | |
|---|---|---|---|
| 5,042,006 | 8/1991 | Flohrer | 395/275 |
| 5,043,884 | 8/1991 | Kuhlmann et al. | 395/325 |
| 5,122,972 | 6/1992 | Richards et al. | 395/157 |
| 5,287,448 | 2/1994 | Nicol et al. | 395/159 |
| 5,388,251 | 2/1995 | Makino et al. | 395/575 |

FOREIGN PATENT DOCUMENTS

| | | |
|---|---|---|
| 61-243518 | 10/1986 | Japan. |
| 62-262120 | 11/1987 | Japan. |
| 63-66623 | 3/1988 | Japan. |
| 1-280821 | 11/1989 | Japan. |

*Primary Examiner*—Kevin J. Teska
*Assistant Examiner*—Ayni Mohamed
*Attorney, Agent, or Firm*—Lowe, Price, LeBlanc & Becker

[57] ABSTRACT

An apparatus for producing an operational manual of an integraged services digital network (ISDN) terminal and supplying the same to an operator of the ISDN terminal. The operational manual teaching how to operate a minimum procedure to obtain one of functions. Each of the functions includes the plurality of minimum procedures which can no longer be segmented. The ISDN terminal and the apparatus are coupled to the ISDN terminal via the ISDN. The operator of the ISDN terminal requires the operational manual by means of a predetermined called party subaddress or a dial-in which are defined by CCITT. Since the apparatus produces the operational manual by properly combining the minimum procedures, the operational manual can satisfy the various levels of skills of the operator.

12 Claims, 16 Drawing Sheets

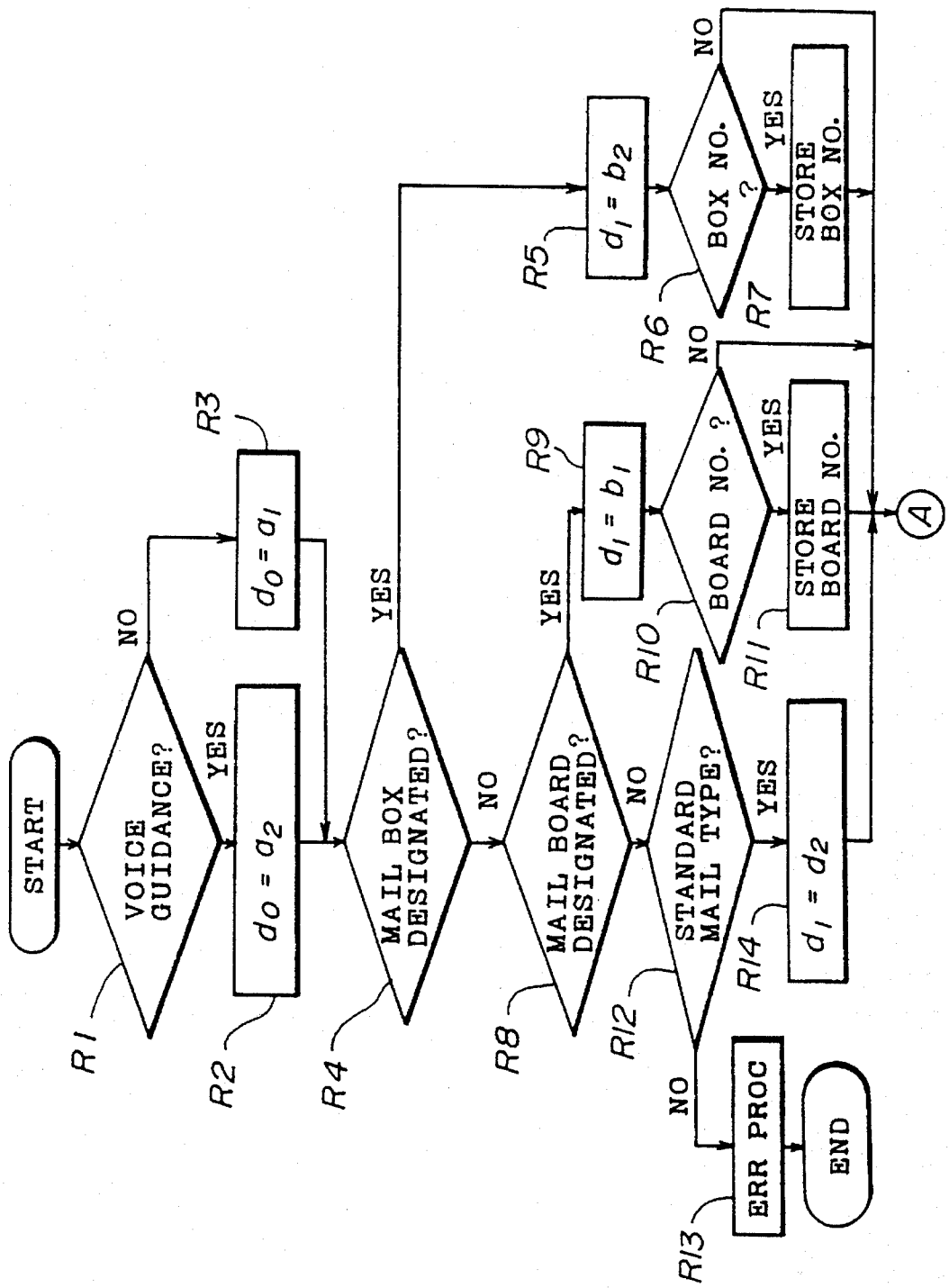

40

EXECUTE FOLLOWING PROCEDURE

1. SET MANUSCRIPT IN FAX.
2. TELEPHONE MAIL CENTER.
3. ENTER KEY AFTER VOICE GUIDANCE "THIS IS MAIL CENTER. WE ARE STARTING ACCEPTANCE."
4. ENTER CALLING TEL. NO. AND [#][#]
5. "PRESS START BUTTON."
6. PLACE RECEIVER ON HOOK.

[7][7][8][1][1]

[1][2][3][4][5][6][7][8][#]  YOUR ID
[0][0][0][2][=]              SERVICE CODE
[0][3][1][4][3][0][#]        TIME
[ ][ ][ ][ ][ ][#][#]        TEL NO.
[START]

FIG. 11

EXECUTE FOLLOWING PROCEDURE

1. SET MANUSCRIPT IN FAX.
2. TELEPHONE MAIL CENTER. ⬚7⬚7⬚7 ⬚8⬚1⬚1
3. ENTER KEY AFTER VOICE GUIDANCE "THIS IS MAIL CENTER. WE ARE STARTING ACCEPTANCE."

⬚1⬚2⬚3⬚4⬚5⬚6⬚7⬚8⬚#    YOUR ID
⬚0⬚0⬚0⬚2⬚#    SERVICE CODE
⬚0⬚3⬚1⬚4⬚3⬚0⬚*    TIME
⬚⬚⬚⬚*⬚#    TEL NO.

4. ENTER CALLING TEL. NO. AND ⬚*⬚#
5. PRESS START BUTTON. [START]
6. PLACE RECEIVER ON HOOK.

~50

APPARATUS FOR PRODUCING OPERATIONAL MANUAL

This application is a continuation of Application Ser. No. 08/249,695 filed May 31, 1994 now abandoned, which is a continuation of Application Ser. No. 07/719,135, filed Jun. 20, 1991 now abandoned.

BACKGROUND OF THE INVENTION

The present invention relates generally to apparatuses for producing an operational manual of a certain machine which teaches how to operate the machine, and more particularly to an apparatus for producing an operational manual appropriate to the level of skill of an operator of the terminal connected to an integraged services digital network (abbreviated ISDN hereinafter).

As a result of the great advances made in the development of the ISDN and communication machines, ISDN terminals have become more and more complicated and thus difficult to use and the operational manuals thereof have become very large volumes. Thus, an operator of the ISDN terminal cannot quickly find a how to operate a particular process or procedure in an operational manual. Accordingly, an apparatus having a so-called help function has been developed. The help function helps the operator by displaying help information items, each of which teaches how to operate a particular process or procedure, on a display screen when he/she pushes a help key. A predetermined process requested by the operator generally comprises a plurality of minimum procedures which can no longer be segmented, and the conventional help information item is prepared for every process and/or for every given combination of the minimum procedures. Incidentally, the help information is stored in a memory of the apparatus. Thus, since the kinds of the help information items are limited and the levels thereof are uniform, the help information items cannot always provide appropriate answers to the variety of questions with operators having various levels of skill.

Due to the above problem, various types of help functions for supplying an operator with the desired help information item by taking into account his/her experience and/or the content of the operation have been developed as described below:

Firstly, Japanese Laid-Open Patent Application No.61-243518 discloses a help guide system in which help information items have been prepared for various kinds of combinations of the minimum procedures and automatically selected by analyzing data input and/or output by the operator, and in which the operator further selects the desired help information item from among the preselected help information items. If the operator cannot find the desired help information item, he/she can increase the number of the help information items to be selected. Since the number of the help information items indicated on the screen is limited, he/she can easily and quickly find the desired help information item.

Secondly, Japanese Laid-Open Patent Application No.62-262120 discloses an operation guidance learning device in which help information items have been prepared for various kinds of combinations of the minimum procedures and the number thereof is limited by automatically removing the help information item pertaining to a particular operation which the same operator and/or operators belonging to the same group repeat more than a predetermined number of times. Alternatively, the help information items may be removed by an operator's command.

Thirdly, Japanese Laid-Open Patent Application No.63-66623 discloses an intellectual operation backup system in which the optimal number of help information items is automatically limited by analyzing the operator's identification and experience, the machine's identification, and the like. Even in this reference, help information items have been prepared for various kinds of combinations of the minimum procedures.

Fourthly, Japanese Laid-Open Patent Application No.1-280821 discloses a guide help system in which, by analyzing procedures which have already been performed by an operator, a series of subsequent procedures of a process is automatically produced and indicated on a screen, when the operator pushes the help key.

However, the above help functions disclosed in the references No.61-243518, No.61-262120, No.63-66623 and No.1-280821 are respectively disadvantageous.

As to the help functions disclosed by the references No.61-243518, No.61-262120 and No.63-66623, since the number of the help information items prepared for various combinations of the minimum procedures is limited by the storage capacity of the memory, these help information items cannot always satisfy the operator. On the other hand, if the storage capacity of the memory is increased, the help function may handle more requests of the operator, but the cost of the apparatus will be increased. In addition, even the help function in Japanese Laid-Open Patent Application No.1-280821 cannot satisfy all the various types of requests of the operator since the patterns of the series of subsequent procedures are preselected. And, as with the other three references, if the number of the patterns is increased, the storage capacity of the memory will also be increased and the machine having such a memory will become more expensive.

Furthermore, the apparatus having an effective help function for the ISDN terminal has not been proposed.

SUMMARY OF THE INVENTION

Accordingly, it is a general object of the present invention to provide a novel and useful apparatus for producing an operational manual in which the above disadvantages are eliminated.

Another object of the present invention is to provide an inexpensive apparatus for producing an operational manual to an operator of an ISDN terminal which supplies desired help information appropriate to the level of skill of the operator.

According to one feature of the present invention, an apparatus for producing an operational manual of an integraged services digital network (ISDN) terminal and supplying the same to an operator of the ISDN terminal, the operational manual teaching how to operate a minimum procedure to obtain one of functions, each of the functions comprising the plurality of minimum procedures which can no longer be segmented, the ISDN terminal and the apparatus being coupled to the ISDN terminal via the ISDN, comprises communication means for controlling the communicating the apparatus with the ISDN terminal by means of predetermined protocol information transmitted between the ISDN terminal and the apparatus, first memory means for storing a help information item for every minimum procedure, each help information item indicating how to operate a corresponding minimum procedure, second memory means for storing operations which are input to the ISDN terminal by the operator, detecting means, coupled to the second memory means, for analyzing the operations stored in the second memory means and for detecting a predetermined function desired by the operator, edit means, coupled to the communication means, first memory means and detecting means, for producing an operational manual containing help information items corresponding to the predetermined function, and for supplying the operational manual to the operator of the ISDN terminal if the communication means receives predetermined protocol information from the ISDN terminal.

The apparatus according to the present invention can satisfy the various levels of skills of operators of the ISDN terminal because the operational manual is produced for every minimum procedure. In addition, the apparatus is relatively inexpensive because it uses a plurality of address with which the apparatus is equipped instead of using a memory having great large storage capacity.

Other objects and further features of the present invention will become apparent from the following detailed description when read in conjunction with the accompanying drawings.

BRIEF DESCRIPTION OF THE DRAWINGS

FIGS. 7A and 7B show a part of a flowchart shown in FIG. 6 which is indicated in detail;

FIG. 11 shows an example of an operational manual output from the manual producing buffer shown in FIG. 9;

DESCRIPTION OF THE PREFERRED EMBODIMENTS

Figure 1:
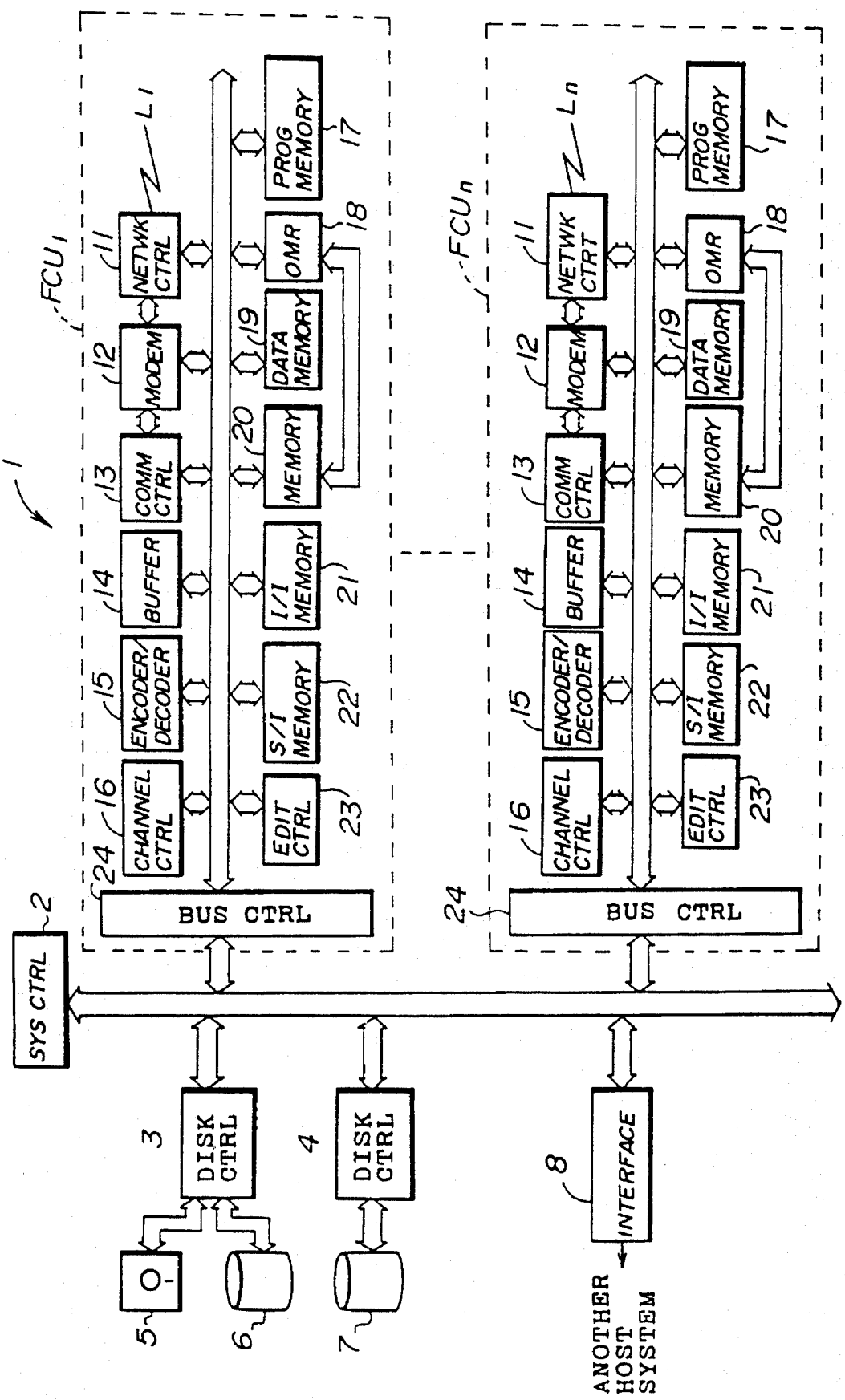
FIG. 1 shows a system block diagram of a facsimile mail system according to the present invention.

A facsimile mail system 1 according to the present invention comprises, as shown in FIG. 1, a system controller 2, disk controllers 3 and 4, a floppy disk driver 5, hard disk drivers 6 and 7, a host interface 8, and a plurality of communication processors FCU1 to FCUn. Incidentally, the facsimile mail system 1 further comprises a keyboard (not shown), a keyboard controller (not shown) and a display unit (not shown). The system controller 2, the disk controllers 3 and 4, the host interface 8, and the respective communication processors FCU1 to FCUn are operatively interconnected with each other via a bus. The apparatus for producing an operational manual according to the present invention is provided with each of the communication processors FCU1 to FCUn. The disk controller 3 is operatively interconnected to the floppy disk driver 5 and the hard disk driver 6. The disk controller 4 is operatively interconnected to the hard disk driver 7. The facsimile mail system 1 has various service functions, such as a buck-up function, a multicast function, a confidential communication function, a time designation transmission function, a mail board service function, a mail box function, and a broadcasting function. It is necessary for an operator of a terminal to execute a predetermined protocol and then request one of the above functions from the facsimile mail system 1 before he/she uses one of the above functions. The operator may use a mark sheet or a push button (PB) tone signal when he/she transmits some information to the facsimile mail system 1.

The system controller 2 controls the operating of each part of the facsimile mail system 1 in accordance with programs stored in the floppy disk driver 5 and/or the hard disk drivers 6 and/or 7. The system controller 2 also controls the writing/reading of an image data in/from a floppy disk in the floppy disk driver 5 and hard disks in the respective hard disk drivers 6 and 7, and in addition, it controls the communication processors FCU1 to FCUn to execute one of the service functions of the facsimile mail system 1.

The disk controllers 3 and 4 respectively control the floppy disk driver 5 and hard disk drivers 6 and 7. The floppy disk driver 5 and/or the hard disk drivers 6 and/or 7 respectively store various kinds of data, in particular a piece of mail received from the terminal or a host machine.

The facsimile mail system 1 is connected to a host machine, such as a host computer or another facsimile mail system, via the host interface 8 so that they can communicate with each other. The host interface 8 may be a direct memory access controller (DMAC) which connects the facsimile mail system 1 directly to the host machine.

The number of the communication processors FCU1 to FCUn corresponds to that of communication lines L1 through Ln. As indicated by a dotted line in FIG. 1, each of the communication processors FCU1 to FCUn comprises a network controller 11, a MODEM 12, a communication controller 13, a manual producing buffer 14, an encoder/decoder 15, a channel controller 16, a control program memory 17, an optical mark reader (OMR) 18, a data memory 19, a temporary memory 20, an instructing information memory 21, a system information memory 22, an edit controller 23 and a bus controller 24. The respective elements of a communication processor are coupled to one another via a bus. In addition, the network controller 11 is further coupled to a corresponding one of the line networks L1 to Ln, and the MODEM 12. Each communication line may be a ISDN. The MODEM 12 is further connected to the communication controller 13. The temporary controller 20 is coupled to the OMR 18. Each communication processor is coupled to the bus, to which the system controller 2, disk controllers 3 and 4, or the like are connected.

This network controller 11 comprises a so-called AA-NCU (network control unit) which automatically processes outgoing/incoming call procedures.

The MODEM 12 modulates a signal to be transmitted therefrom and demodulates a signal transmitted thereto.

The communication controller 13 transmits and/or receives a protocol signal to/from a terminal via one of the communication lines L1 to Ln. The protocol signal is used, for example, when the operator of the terminal executes a predetermined protocol. The network controller 11 controls communicating through a signal channel (D-channel) and a data channel (B-channel). In addition, the network controller 11 may function as a signal processor of the layer 1, and combine and/or separates signals from a D-channel and B-channel.

The manual producing buffer 14 stores the operational manual.

The encoder/decoder 15 encodes the piece of mail, and decodes the encoded piece of mail.

The channel controller 16 sequentially controls each part of the communication processor in accordance with control programs, and additionally outputs an operational manual. Further, the channel controller 16 analyzes the service request stored in the temporary memory 20, and executes the requested service function. The channel controller 16 also identifies an operator of the terminal by comparing the received user ID with that stored in the system information memory 22.

The control program memory 17 stores various programs, some of which is used for the channel controller 16.

The OMR 18 judges whether or not a service request is transmitted by means of a mark sheet. If the operator uses the mark sheet, the OMR 18 optically reads marks and mark positions on the mark sheet, and store them in the temporary memory 20.

Figure 2:
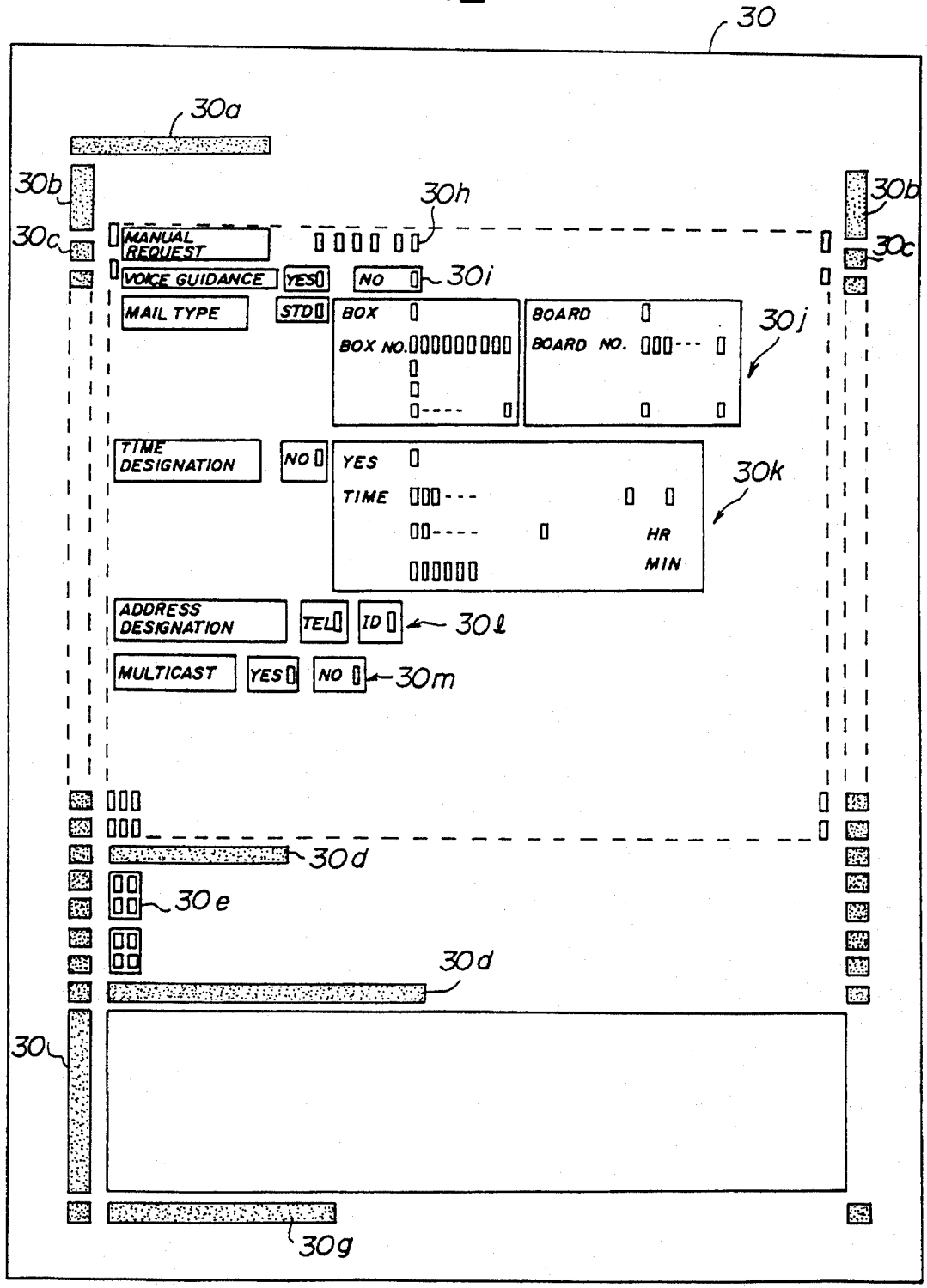
FIG. 2 shows an example of a mark sheet to be transmitted from the terminal to the facsimile mail system shown in FIG. 1.

A description will now be given of a mark sheet with reference to FIG. 2. A mark sheet 30 comprises a start mark 30a, maximum gradient judging marks 30b, timing marks 30c, mode switch marks 30d, special numeric letter mark 30e, a free region indication mark 30f, an end mark 30g, manual request marks 30h, voice guidance marks 30i, mail type marks 30j, time designation marks 30k, address designation marks 30l and multicast request marks 30m.

The start mark 30a indicates a beginning of a data on the mark sheet 30. The maximum gradient judging marks 30b indicate an initial gradient of the mark sheet 30, by which it is judged whether the mark sheet 30 is inserted and scanned in a correct direction. The timing marks 30c respectively clearly indicate mark positions on the mark sheet 30, by which each position of a mark lain between corresponding timing marks 30c can be identified. The mode switch marks 30d are respectively used for switching modes of the facsimile mail system 1. For example, the upper mode switch mark 30d informs the facsimile mail system 1 that there are normal marks above the upper mode switch mark 30d. On the other hand, the lower mode switch mark 30d informs the facsimile mail system 1 that there are special numeric letter marks 30e above the lower mode switch mark 30d. Each of the special numeric letter mark 30e represents a predetermined number by means of being drawn therein. The free region indication mark 30f informs the facsimile mail system 1 that there is an image comprising a figure and/or a massage within a corresponding region. Therefore, the facsimile mail system 1 does not regard the image as a mark. The end mark 30g indicates an end of a data on the mark sheet 30. Incidentally, marks 30a to 30g are generically named as a control mark hereinafter. The manual request marks 30h indicate whether an operator of a terminal requests an operational manual. The voice guidance marks 30i indicate whether or not a voice guidance is selected. When the operator selects the voice guidance, he/she can hear an explanation by telephone or something. The mail type marks 30j select a kind of a piece of mail from among a standard mail type, a mail box type and a mail board type. Incidentally, a mail box and a mail board are respectively established by a serial number. The time designation marks 60k indicate whether the operator has designated a time. The address designation marks 30l indicates whether the facsimile mail system transmits a signal to the terminal by means of a telephone number of the terminal or an address ID thereof. The multicast request marks 30m indicates whether the operator requests a multicast transmission.

The data memory 19 stores a data only used for producing an operational manual from among data transmitted from the terminal. The data to be stored in the data memory 19 comprises an operational manual request command, a kind of operational manual (from among the various service functions of the facsimile mail apparatus 1), identifications of a communicatee terminal and/or an operator thereof, and the level of skill of the operator.

The data memory 19 may further store data of an operational resume for every terminal, every operator of the terminal and every operator of this facsimile mail apparatus 1. The operational resume indicates who transmits what data to whom. Moreover, the data memory 19 stores data which has been input to the terminal or this facsimile mail apparatus 1 in order to monitor the operator of the terminal.

The temporary memory 20 temporarily stores the judging result of the OMR 18. In addition, it temporarily stores a piece of mail which is not transmitted as a mark sheet, or which is transmitted from the floppy disk driver 5 and/or the hard disk drivers 6 and/or 7 to a terminal.

Figure 3:
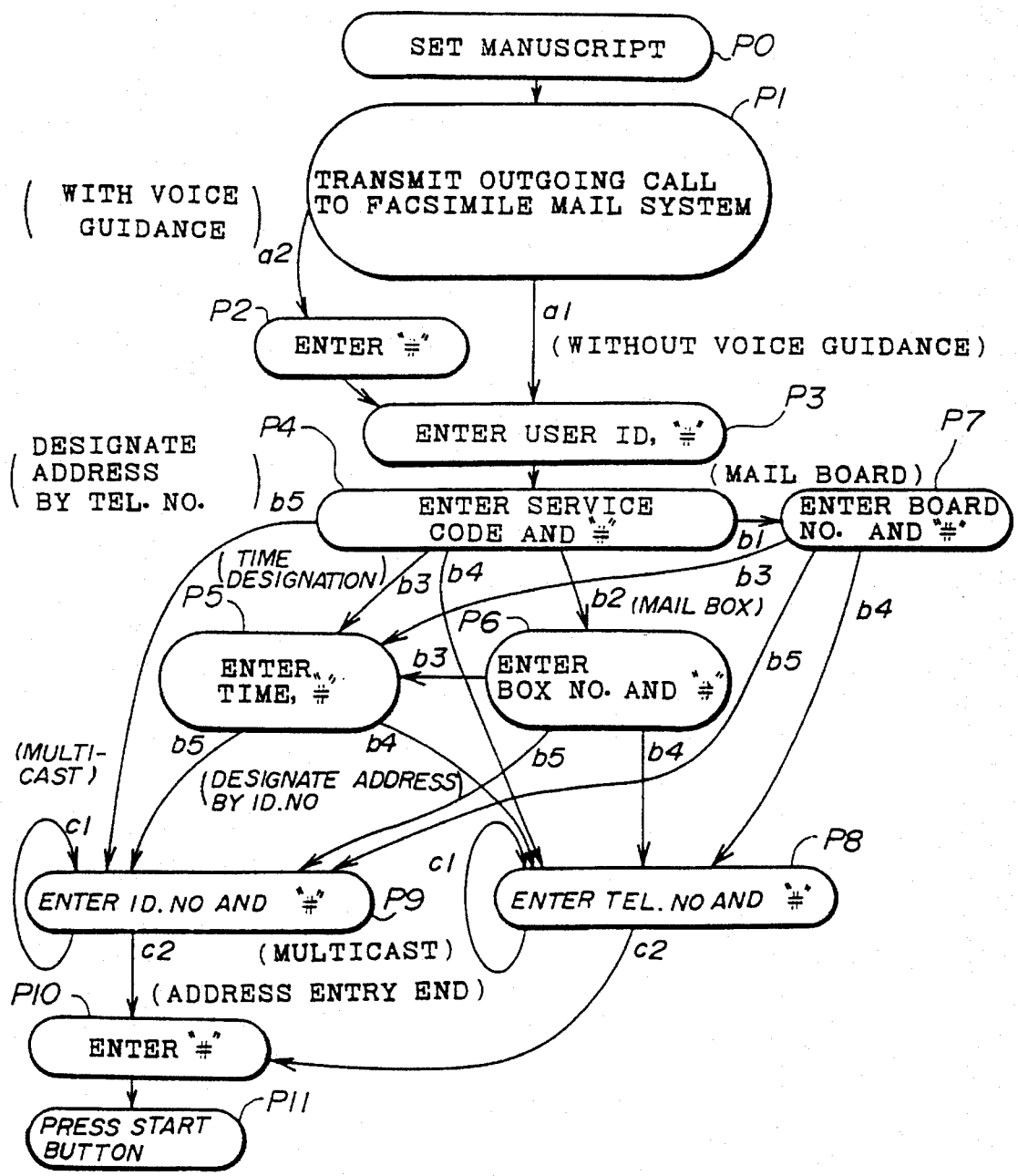
FIG. 3 shows minimum procedures to be operated by an operator of a terminal when the operator requests a predetermined service function to the facsimile mail system shown in FIG. 1.
Figure 4:
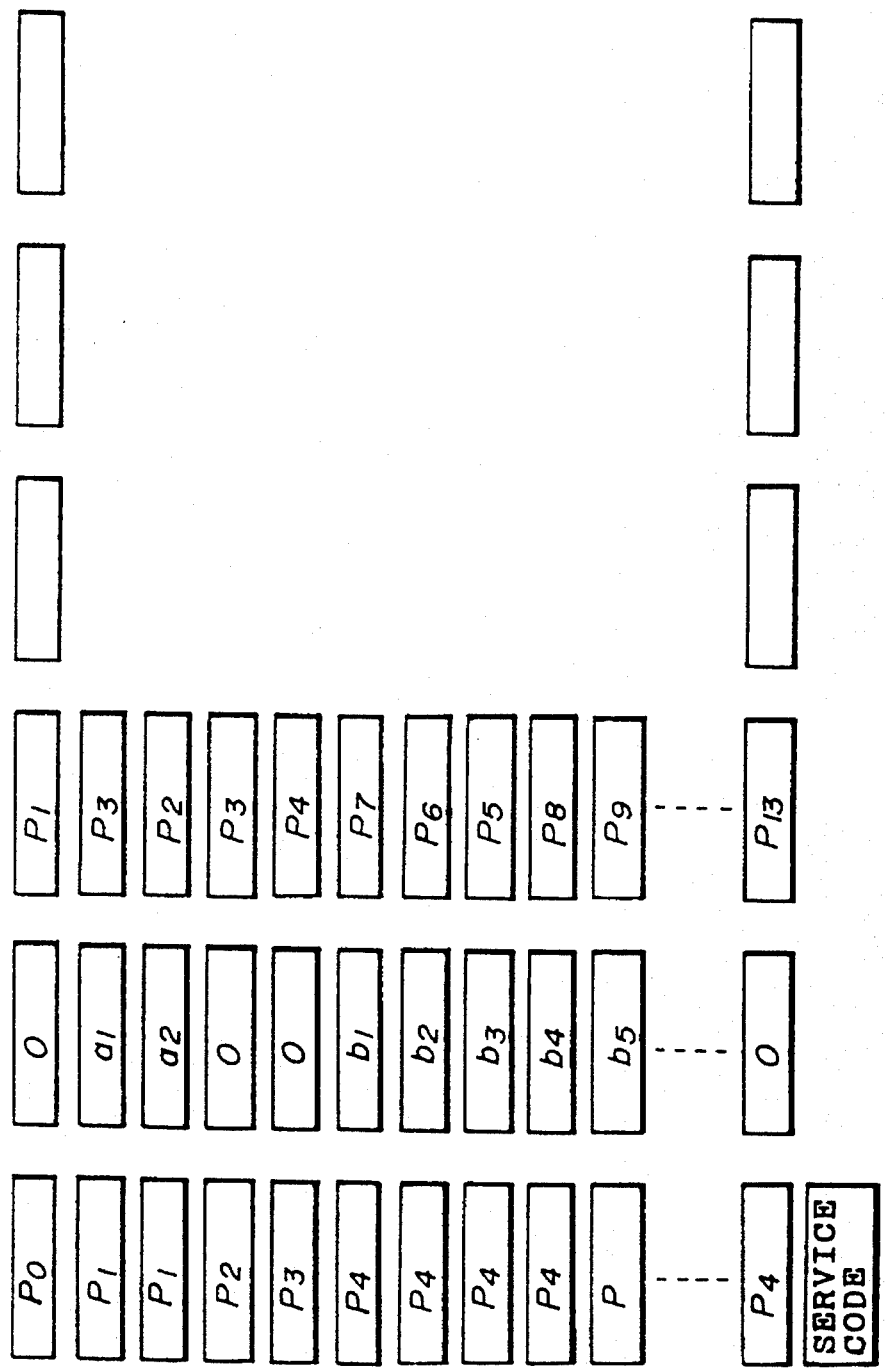
FIG. 4 shows a relationship between the minimum procedures shown in FIG. 3 and the system parameters shown in FIG. 5, which is stored in the instructing information memory in the facsimile mail system shown in FIG. 1.
Figure 5:
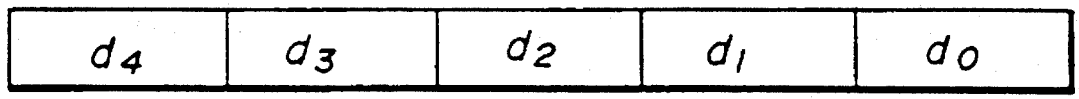
FIG. 5 shows a view for explaining system parameters used for the flowchart shown in FIG. 5.

The instructing information memory 21 stores help information items which are prepared for every minimum procedure shown in FIG. 3. An operator of a terminal operates in accordance minimum procedures shown in FIG. 3 to obtain a particular service function of this facsimile mail system 1. Each minimum procedure is correlated with a system parameter, as shown in FIG. 4, so that the next minimum procedure is freely generated by combining the minimum procedure and the system parameter, which will be described later. The instruct information memory 21 comprises a system parameter buffer therein. As shown in FIG. 5, the system parameter buffer stores system parameters therein. The respective system parameter determines a combination of the minimum procedures P0 to P11, so that the minimum procedures can be freely combined and various processes comprising such minimum procedures can be made. In FIG. 5, the system parameter d0 indicating whether or not the voice guidance is to be selected is determined based on the voice guidance marks 30i, so that either the minimum procedure P2 or P3 shown in FIG. 3 is selected after the minimum procedure P1. The system parameter d1 indicating a mail box or a mail board is determined based on the mail type marks 30j, so that either minimum procedure P6 or P7 shown in FIG. 3 may be selected after the minimum procedure P4. However, if an operator of the terminal selects a standard mail type in FIG. 2, one of minimum procedures b3 to b5 shown in FIG. 3 is selected. The system parameter d2 indicating a designated time is determines based on the time designation marks 30k, so that the minimum procedure P5 may be selected after the minimum procedure P4. The system parameter d3 indicating a telephone number of the terminal or an address identification thereof is determined based on the address designation marks 30l, so that either minimum procedure P8 or P9 shown in FIG. 3 may be selected after one of the minimum procedures P4 to P7. The system parameter d4 indicating a multicast transmission is determined based on the multicast request marks 30m, so that one of the minimum procedures PS, P9 and P10 is selected after either the minimum procedure P8 or P9.

The system information memory 22 stores various system information items, such as a user identification (ID) number, an address ID number, and a telephone number. The user ID is used for identifying an operator of each terminal. The address ID and the telephone number are respectively used for identifying each terminal. The system information memory 22 comprises a register in which a predetermined service code corresponding to a predetermined service function requested by the operator is stored. The system information item is used for executing one of the various functions of the facsimile mail system 1.

The edit controller 23 edits and produces an operational manual. The edit controller 23 has three counters "m", "n" and "1". The edit controller 23 checks the data stored in the data memory 19 to judge what kind of operational manual the manual is, the level of skill of the operator, and the like. In addition, it reads out the help information items from the instructing information memory 21, and produces the operational manual in the operational manual producing buffer 14. Moreover, if the system information item is stored in the system information memory 22, the edit controller 23 adds the system information item to the operational manual.

Figure 6A:
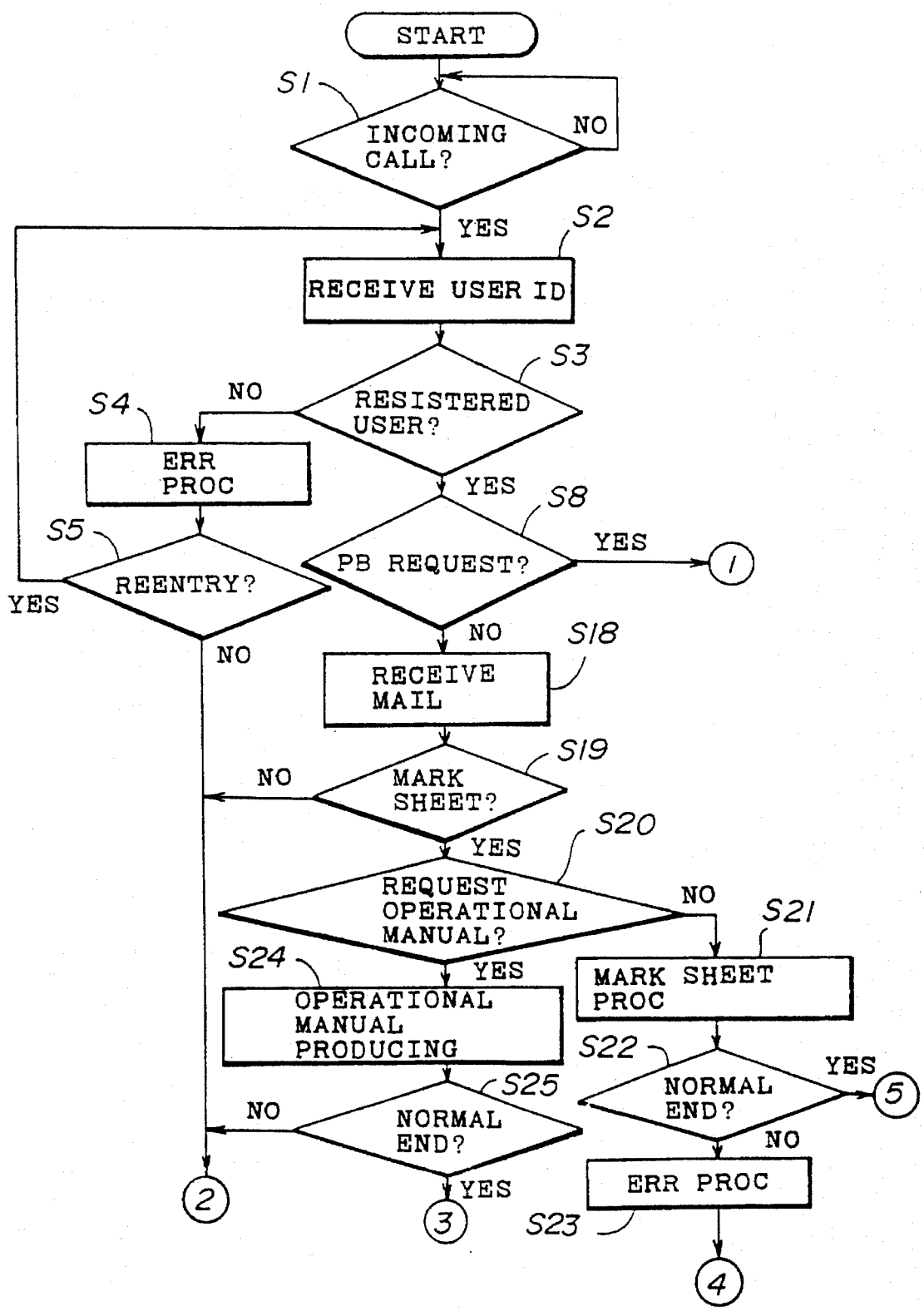
FIGS. 6A–6C show a general flowchart executed by the facsimile mail system shown in FIG. 1 which processes an signal transmitted from the terminal.
Figure 6B:
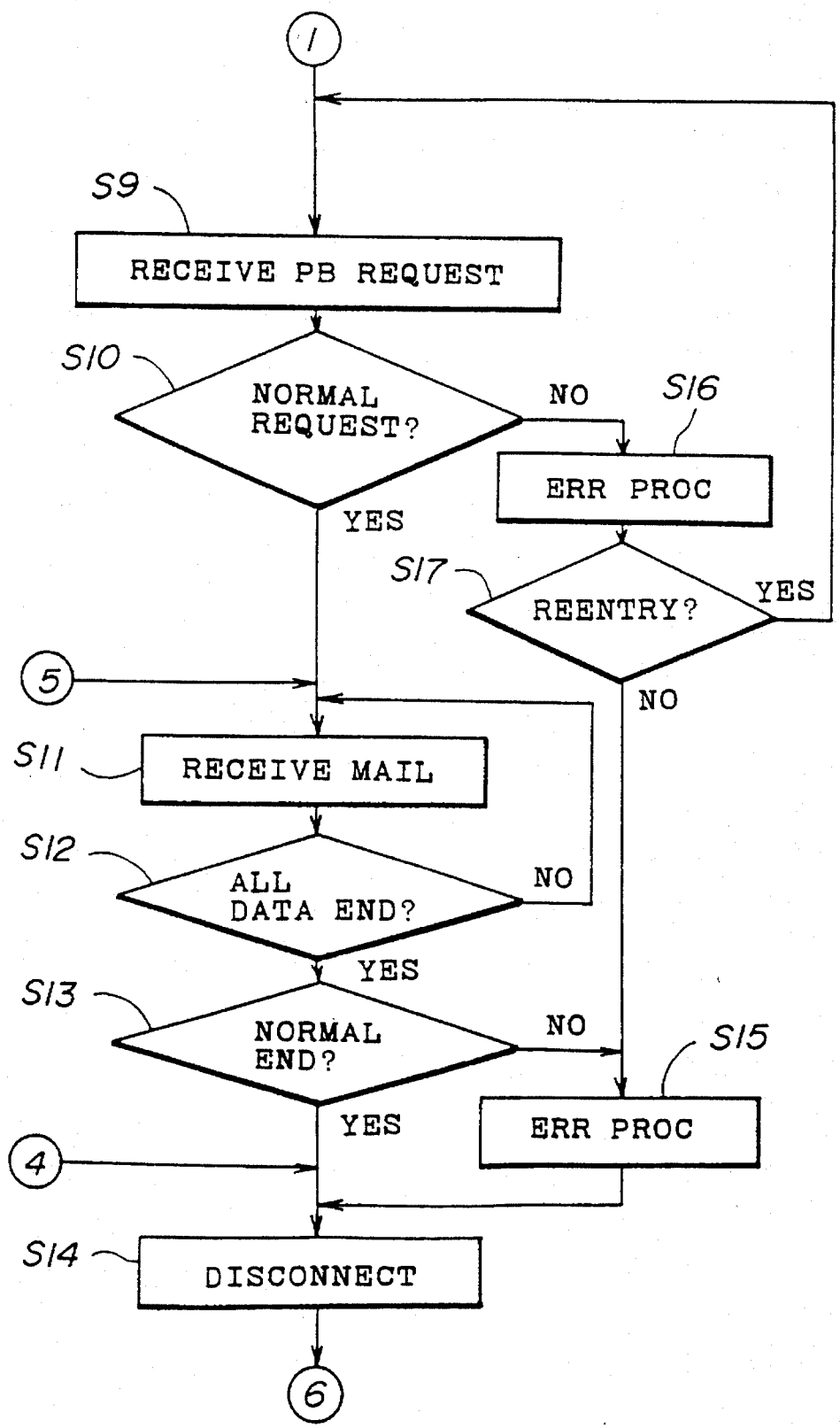
Figure 6C:
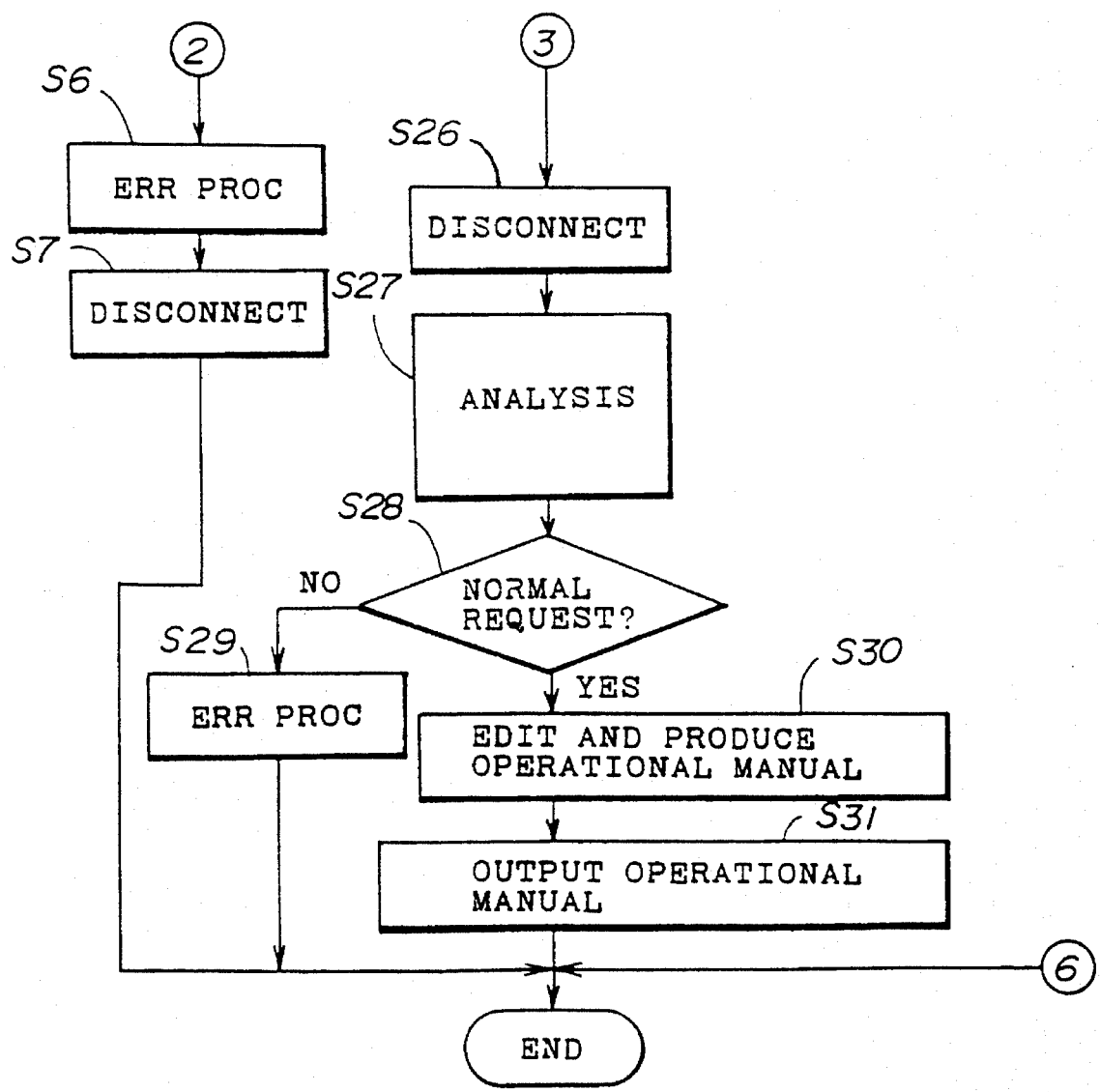

A description will now be given of the operation of the facsimile mail system 1 which processes a protocol established between the facsimile mail system 1 and a terminal, with reference to FIGS. 6A to 6C. The network controller 11 and the communication controller 13 first judge the presence of an incoming call from the terminal (in step S1). If the network controller 11 receives the incoming call, a user ID included therein is demodulated by the MODEM 12 and transmitted to the channel controller 16 (in step S2). Then the channel controller 16 judges whether or not the user ID has been registered in the system information memory 22 (in step S3). If the user ID has not been registered yet, the channel controller 16 performs an error procedure (in step S4). Then the channel controller 16 judges whether or not another data has been entered therein (in step S5). If another data has been entered, the procedure is fed back to the step S2. However, if another data has not been entered therein, the channel controller 16 performs the error procedure and disconnects a corresponding communication line between the facsimile mail system 1 and the terminal (in steps S6 and S7). Incidentally, the facsimile mail system 1 may supply an available service function to the operator even if his/her user ID has not been registered therein.

If the user ID has already been registered in the step S3, the channel controller 16 judges whether or not the operator requests a particular service function by means of a PB tone signal (in step S8). If the operator has used a PB tone signal, the channel controller 16 accepts the PB request (in step S9). Then the channel controller 16 judges whether or not a request by means of the PB tone a predetermined protocol (in step S10). For example, if the PB tone signal is clearly transmitted to the facsimile mail system 1, it is judged to be in such accordance. If the request is in such accordance, the communication controller 13 starts to receive a piece of mail (in step S11). Subsequently, the channel controller 16 judges whether or not all the received piece of mail are in accordance with a protocol (in steps S12 and S13). For example, if a number of error lines is less than a predetermined value, all the received piece of mail are judged to be in such accordance. Lastly, a corresponding communication line is disconnected (in steps S14 and S15). However, if all the received piece of mail are not in such accordance, the channel controller 16 performs the error procedure and disconnects the corresponding communications line (in steps S15 and S14).

On the other hand, if the PB request is judged not to be in accordance with the protocol in the step S10, the channel controller 16 performs the error procedure (in step S16), so that the operator of the terminal can notice that the PB request has been rejected. Then, the channel controller 16 judges whether or not another data has been entered therein (in step S17). If another data has been entered, the procedure is fed back to the step S9. However, if another data has not been entered therein, the channel controller 16 performs the error procedure and disconnects a corresponding communication line (in steps S15 and S14), so that the operator can know that the communications line is disconnected.

If the operator requests the particular service function by means of the mark sheet, the channel controller 16 judges whether or not the mark sheet has requested an operational manual based on the received piece of mail (in steps S18 to S20). The channel controller 16 can judges whether the piece of mail is transmitted by the mark sheet by detecting the control mark on the mark sheet. If the mark sheet has not requested the operational manual, the mark sheet is generally processed (in step S21). That is, each mark and each mark position are read by the OMR 18, and the result is stored in the temporary memory 20 and then analyzed by the channel controller 16. The channel controller 16 judges whether or not all the data on the mark sheet is in accordance with a protocol (in step S22). If the channel controller 16 judges NO, it performs the error procedure and then disconnects the corresponding communication line (in steps S23 and S14). However, if the channel controller 16 judges that all the piece of mail is in accordance with the protocol, the procedure is fed back to the step S11.

If the mark sheet requests the operational manual at the step S20, the channel controller 16 edits and produces the operational manual (in step S24). Then, the channel controller 16 judges whether or not all the data on the mark sheet is in accordance with a protocol (in step S25). If all the data is not in accordance with the protocol, the procedure is fed back to the step S6. However, if all the data is in accordance with the protocol, the channel controller 16 temporarily disconnects the corresponding communications line (in step S26), and analyzes the data on the mark sheet (in step S27). Incidentally, whether the channel controller 16 temporarily disconnects the communication line is a matter of choice. The channel controller 16 analyzes the data in accordance with procedures shown in FIGS. 7A and 7B, which will be described later. Each mark and each mark position are read by the OMR 18, and the results are stored in the temporary memory 20 and then analyzed by the channel controller 16. The channel controller 16 judges whether or not all the data on the mark sheet is in accordance with a protocol (in step S22). Subsequently, the facsimile mail system 1 judges whether or not all the data on the mark sheet are in accordance with the predetermined protocol (in step S28). If the facsimile mail system 1 judges NO, the error process is performed and the procedure ends (in step S29). Incidentally, the operational manual may be produced during the error process. On the other hand, if the facsimile mail system 1 judges YES in the step S28, the operational manual is edited, produced and output to the operator by request (in steps S30 and S31). Incidentally, if the channel controller 16 disconnects the communication line at the step S26, the channel controller 16 connects it again before it transmits the operational manual.

Figure 7B:
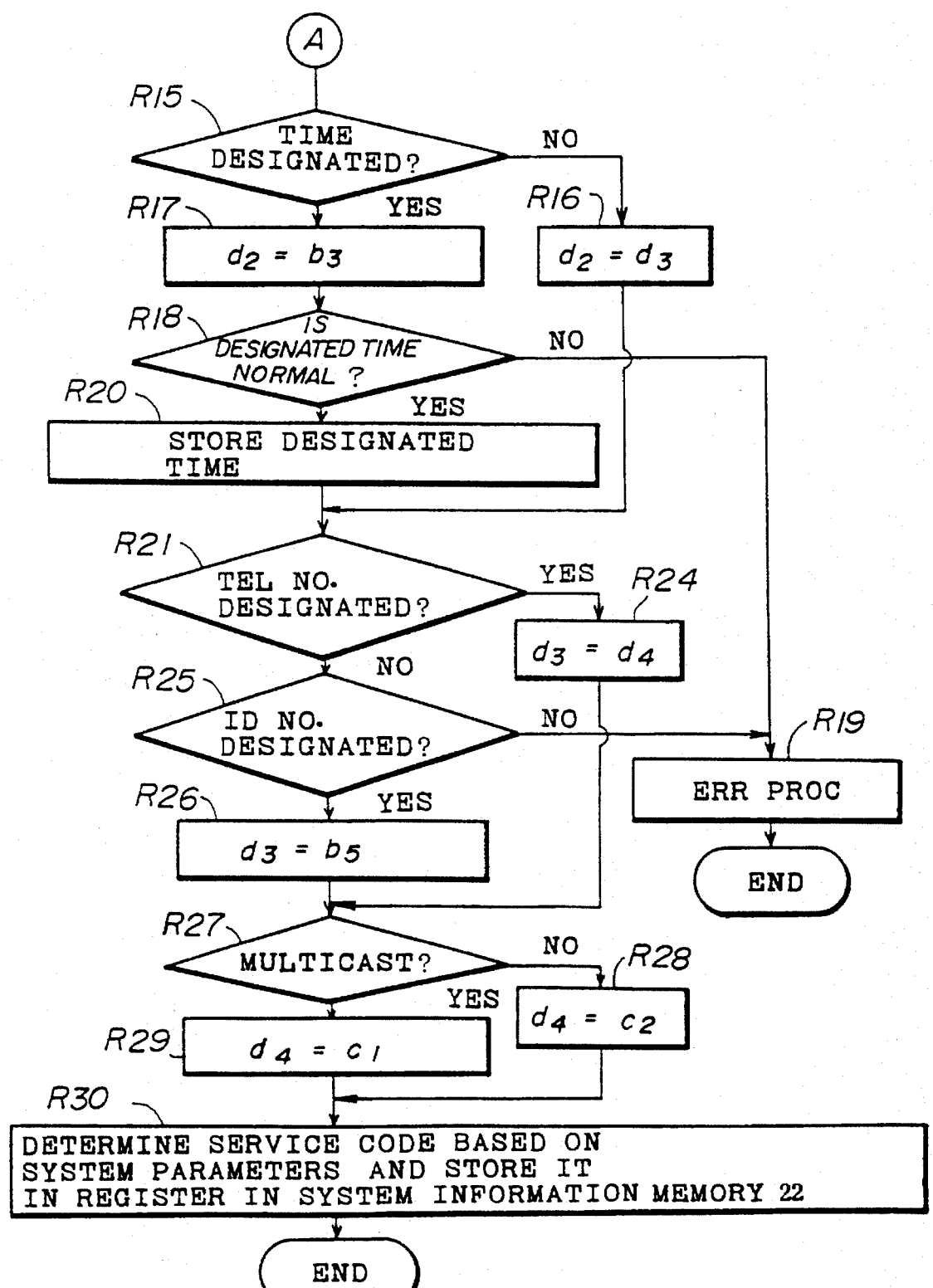

A detailed description will now be given of the procedure in the step S27 with reference to FIGS. 7A and 7B. The channel controller 16 first judges the presence of a voice guidance based on the voice guidance marks 30i (in step R1). If the voice guidance has been selected, the channel controller 16 substitutes a2 for a system parameter d0 in a system parameter buffer within the instruction information memory 21 (in step R2). In this case, the minimum procedure P2 shown in FIG. 3 has been selected after the minimum procedure P1. However, if the voice guidance has not been selected, the channel controller 16 substitutes a1 for the system parameter d0 (in step R3). In this case, the minimum procedure P3 shown in FIG. 3 has been selected after the minimum procedure P1.

Next, the channel controller 16 determines the system parameter d1 (in steps R4 and R8). That is, the channel controller 16 judges what type the mail is based on the mail type marks 30j. If the mail box has been selected, the channel controller 16 substitutes b2 for the system parameter d1 (in steps R4 and R5). In this case, the minimum procedure P7 shown in FIG. 3 has been selected after the minimum procedure P4. Then the channel controller 16 judges whether the mail box number is present in order to store it in the system information memory (in steps R6 and R7). However, if the mail board has been selected, the channel controller 16 substitutes b1 for the system parameter d1 (in steps R8 and R9). In this case, the minimum procedure P6 shown in FIG. 3 has been selected after the minimum procedure P4. Then the channel controller 16 judges whether the mail board number is present in order to store it in the system information memory (in steps R10 and R11). If the operator has selected a standard mail type, the channel controller 16 makes the system parameter d1 equal to the system parameter d2 (in steps R12 and R14). But if the operator has not specified a mail type, the channel controller 16 informs the operator that an error has been made, and terminates the procedure (in steps R12 and R13).

If the mail box number or the mail board number has not been entered by the operator (in steps R6 and R10), the procedure is transferred to step R15 which is after the steps R7, R11 and R14.

In the step R15, the system parameter d3 is determined. If the operator has designated a time by the time designation marks 30k, the channel controller 16 substitutes b3 for the system parameter d2 (in step R15). Then the channel controller 16 judges whether or not the designated time is in accordance with a protocol (in step R18). If the designated time is judged to be in such accordance, the channel controller 16 stores it in the system information memory 22 (in step R20). However, if the designated time is judged not to be in such accordance, the channel controller 16 informs the operator of the occurrence of an error and terminates the procedure (in step R19). On the other hand, if the operator has not specified the time, the channel controller 16 makes the system parameter d2 equal to the system parameter d3 (in step R16). After the step R16 or R20, the channel controller 16 determines the system parameter d3.

That is, the channel controller 16 judges whether or not a telephone number has been designated as an address of the terminal (in step R21). If the telephone number has been designated, the channel controller 16 makes the system parameter d3 equal to the system parameter d4 (in step R24). However, if the telephone number has not been designated, then the channel controller 16 judges whether an address ID has been designated as the address of the terminal (in step R25). If the address ID has not been designated, the procedure is transferred to the step R19. However, if the address ID has been designated, the channel controller 16 substitutes b5 for the system parameter d3 (in step R26). After the step R24 or R26, the channel controller 16 determines the system parameter d4.

That is, the channel controller 16 judges whether or not the operator has selected a multicast transmission (in step R27). That is, if the operator has requested the multicast, the channel controller 16 substitutes c1 for the system parameter d4 (in step R29). On the other hand, if the operator has not requested the multicast, the channel controller 16 substitutes c2 for the system parameter d4 (in step R28). Then the operator determines a service code corresponding to the service function requested by the operator based on the identified system parameters d0 to d4, and stores it in a register (in step R30).

Figure 8A:
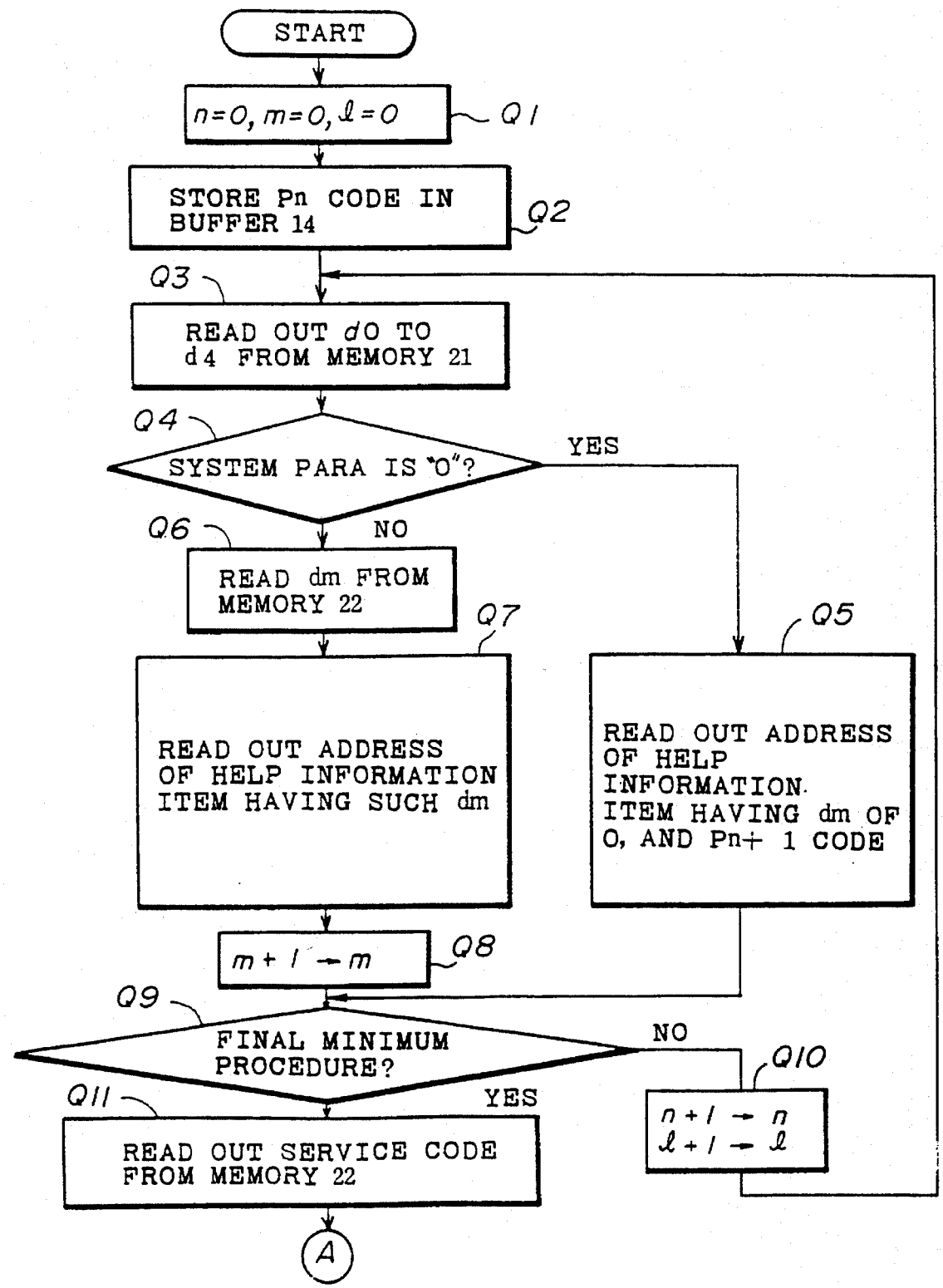
FIGS. 8A and 8B show a part of a flowchart shown in FIG. 6 which is indicated in detail.
Figure 8B:
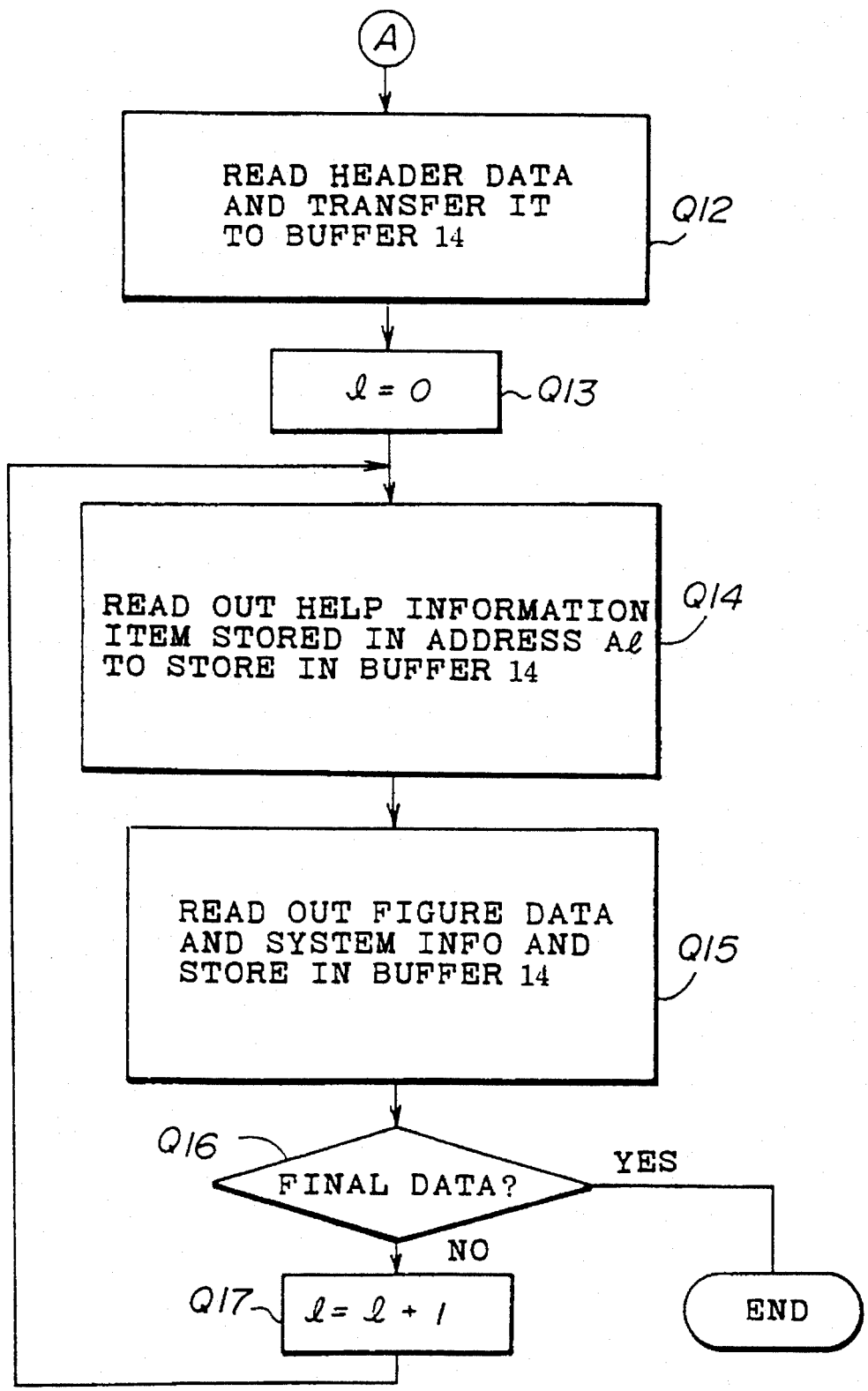

A detailed description will now be given of the procedure in the step S30 with reference to FIGS. 8A and 8B. The edit controller 23 resets its counters "n", "m" and "1" to "0" (in step Q1), and stores a code of each minimum procedure Pn shown in FIG. 3 in the manual producing buffer 14 (in step Q2). That is, the code of the minimum procedure P0 is first stored in the manual producing buffer 14. Next, the edit controller 23 reads out the system parameters d0 to d4 from the instructing information memory 21 (in step Q3), and judges whether or not each system parameter is "0" (in step Q4). If "0" is substituted for a system parameter, the system parameter does not actuate the operation of the edit controller 23. Hereupon, the system parameters d0 to d4 are generically named "dm" hereinafter. If the "dm" is "0" the edit controller 23 reads out an address of the help information item of a minimum procedure Pn having a system parameter of "0" and a code of a next minimum procedure Pn+1 to store them in the manual producing buffer 14 (in step Q5). However, as for the "dm" which is not "0" the edit controller 23 reads out the "dm" from the system information memory 22 (in step Q6). Then the edit controller 23 additionally reads out an address of the help information item corresponding to the minimum procedure Pn having the "dm" and a code of a next minimum procedure Pn+1 from the instructing information memory 21 to store them at an address A1 in the manual producing buffer 14 (in step Q7). Each minimum procedure Pn is correlated with a system parameter dm, as shown in FIG. 4. Therefore, once the step Pn and system parameter are determined, the next minimum procedure Pn+1 and its help information item will be determined.

Figure 9:
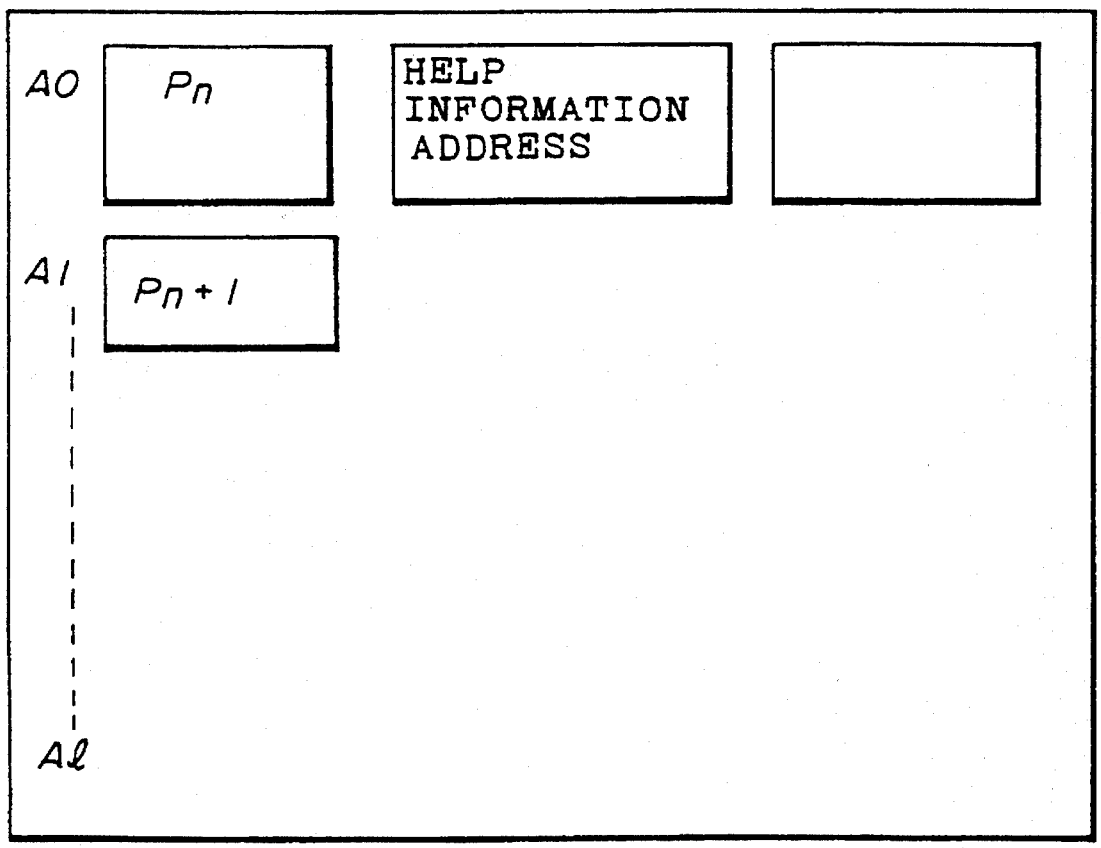
FIG. 9 shows a construction of a manual producing buffer in the facsimile mail system shown in FIG. 1.

As mentioned above, after the next minimum procedure Pn+1 and an address of its help information item is determined, the channel controller 16 counts up the value of the counter (in step Q8), and judges whether it is the final minimum procedure (in step Q9). If it is not final minimum procedure, the edit controller 23 counts up the respective counters "n" and "1", and repeats the procedures from the step Q3. But if the minimum procedure is the final minimum procedure, the manual producing buffer 14 stores, as shown in FIG. 9, the code of the minimum procedure Pn and the address of its help information item at the address A1 thereof.

Figure 10:
FIG. 10 shows an example of a manual stored in the manual producing buffer shown in FIG. 9.

Next, the channel controller 16 reads out a service code from the system information memory 22 (in step Q11), and extracts and transfers a corresponding header information item to a header region 40a of an operational manual 40 within the manual making buffer 14, as shown in FIG. 10, (in step Q12). Then, a step Q13 resets the counter "1" to "0" (in step Q13). The help information item stored in the address A1 is read out and stored in the character data region 40a in the manual producing buffer 40 (in step Q14). In addition, a helpful figure data and the system information, such as a telephone number, an address ID, and the like, are respectively read out and stored in an image region 40c in the manual producing buffer 14 (in step 15). The helpful figure data has been stored in the instructing information memory 21 in advance correlatively with the help information item or independently of it. After each information corresponding to the address A1 is stored in the manual producing buffer 14, the channel controller 16 judges whether it is the final data (in step 16). If it is not final data, 1 is added to a value of the counter "1" and the procedure is transferred to the step Q14 (in step Q17). Likewise, the procedure continues until all the help information items, helpful figure data and the system information are stored in the manual producing buffer 14.

Lastly, the operational manual 50 shown in FIG. 11 is output to the operator, and thus he/she can obtain a desired service function of the facsimile mail system 1 by operating procedures in accordance with the help information items in the operational manual.

Figure 14:
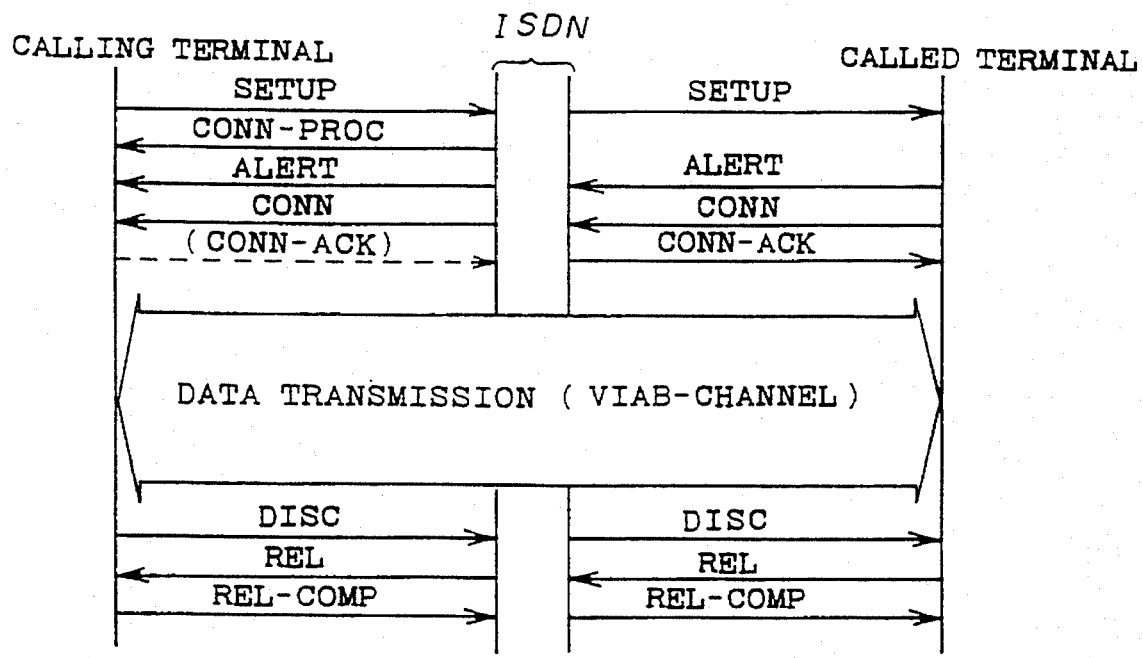
FIG. 14 shows a time chart for explaining a general circuit-switched connection control procedure between ISDN terminals.

Now, it is assumed that the facsimile apparatus and a terminal is connected via the ISDN. As shown in FIG. 14, at first, a calling terminal establishes a line switching mode and transmits a setup message (called SETUP for short) to the ISDN which designates a predetermined called terminal. The SETUP indicates the requirement of the setup with the called terminal. In response, the ISDN transmits the SETUP to the predetermined called terminal so as to transmit an outgoing call. The ISDN transmits a call proceeding message (called CALL PROC for short), which indicates the setup proceeding, to the calling terminal. On the other hand, the called terminal generally transmits an alerting message (called ALERT for short) to the ISDN in response to the incoming call. The ISDN transmits the ALERT to the calling terminal so as to inform the calling terminal about the alert starting of the called terminal. Subsequently, the called terminal transmits a connect message (called CONN for short) to the ISDN, and the ISDN transmits the CONN to the calling terminal so as to inform the calling terminal about the call proceeding of the called terminal. The ISDN transmits a connect acknowledge message (called CONN ACK for short) to the called terminal so that one of a B-channels used for various data transmissions is established between the calling and called terminals. After a predetermined data transmission, the calling terminal transmits a disconnect message (called DISC for short) to the ISDN, and the ISDN transmits the DISC to the called terminal so as to inform the called terminal about the clearing of the B-channels. The called terminal transmits to the ISDN a release message (called REL for short) for clearing the B-channels. In response, the ISDN transmits the REL to the calling terminal. Then the calling terminal transmits a release complete message (called REL COMP for short) to the ISDN, and the ISDN transmits the REL COMP to the called terminal. Consequently, one of the B-channels between the calling and called terminals is released completely. Incidentally, these terms, such as the SETUP, are defined by Comité Consultatif International Télégraphique et Téléphonique (abbreviated CCITT hereinafter).

The SETUP comprises a call reference, a message type, a mandatory information element, and an information element. The protocol discriminator discriminates the protocol recommendations of the layer 3 call control message, such as a format and a sequence. The call reference discriminates which call the message relates to. The message type discriminates the contents of each message. The mandatory information element is always part of each message. The information element is part of each message only when necessary. The number of the mandatory information elements is determined in accordance with the message type, and the number of the information elements is established in accordance with the number of the mandatory information elements. Incidentally, these terms, such as the mandatory information element, are defined by CCITT.

The SETUP also comprises a bearer capability, a channel identification, a calling party number, a calling party subaddress, a called party number, a called party subaddress, a low layer compatibility, a high layer compatibility, useruser, and the like. The bearer capability is a mandatory information element, and the other elements belong to information elements. The bearer capability comprises an information transfer capability, a transfer mode, and a information transfer rate. The information transfer capability indicates the contents of information to be transmitted, such as speech, unrestricted digital data, restricted digital data, 3.1 kHz audio, 7 kHz audio, and video. The transfer mode indicates whether a circuit switching or a packet switching is being used. The bearer capability further comprises transfer type data and protocol data for users. The channel identification designates a channel to be connected and determines whether or not the channel has been established via the ISDN. The calling party number indicates an ISDN number of the calling terminal, and the called party number indicates that of the called terminal. The calling and called party subaddresses respectively discriminate a desired terminal from among a maximum of eight terminals connectable to one passive bus at the calling party or called party. The low layer compatibility, whose function is basically the same as that of the bearer capability, is mainly used for a communication test between the calling terminal and the called terminal. The high layer compatibility mainly used for the compatibility test between the above terminals reprents the type of a terminal, such as a group 2/group 3 FAX, a G4 FAX, a mix mode, a teletex, a videotex, a telex, or a message handling system. The user-user is used for the information transmission among users. The user-user information, without being interpreted by the ISDN, is used for information transmission between users. Incidentally, these terms, such as the calling party number, are defined by CCITT.

Figure 12:
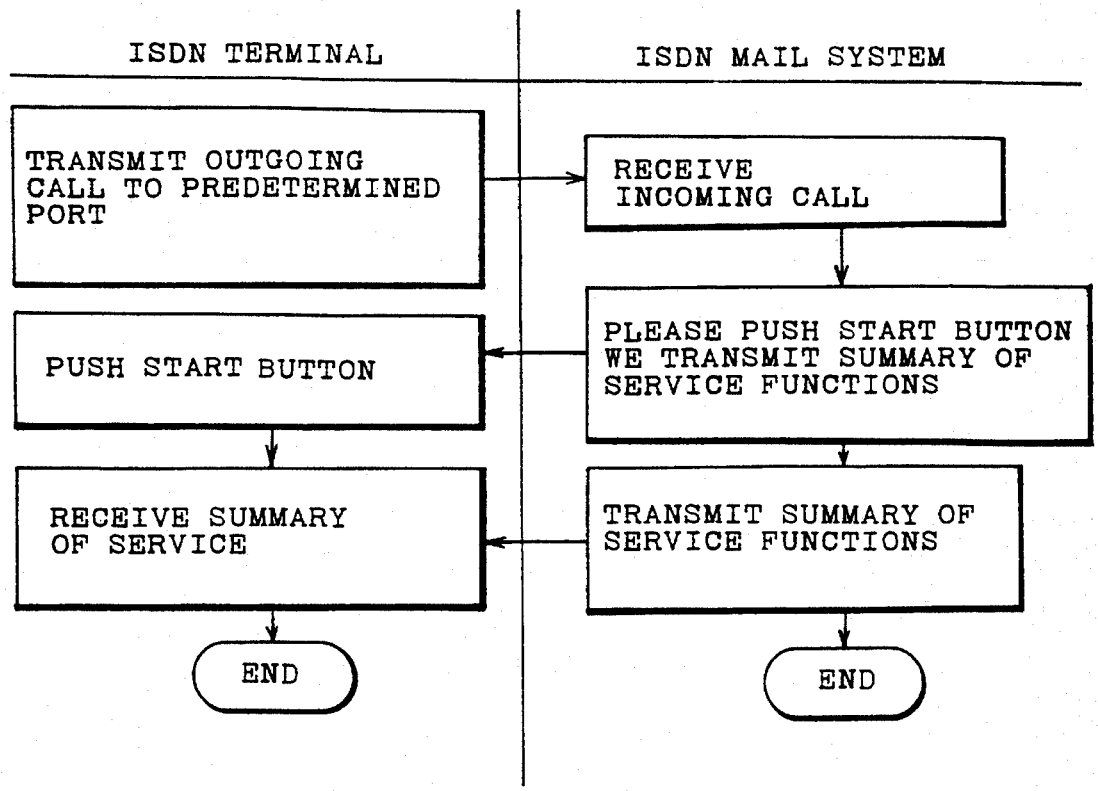
FIG. 12 shows a view for explaining a general procedure in a case where the facsimile mail system shown in FIG. 1 transmits a summary of service functions.
Figure 13:
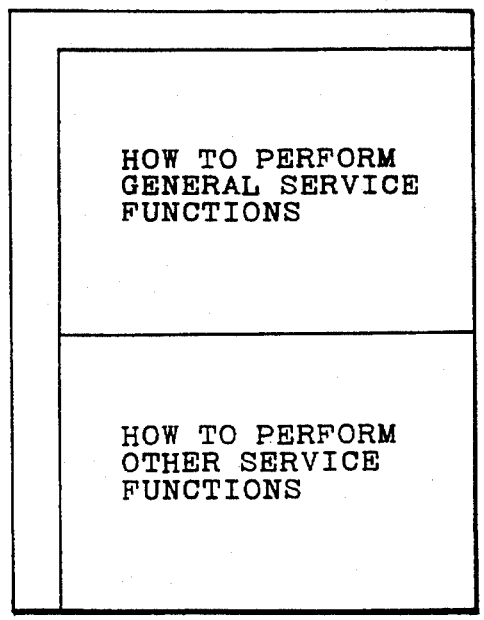
FIG. 13 shows an example of a summary of an operational manual transmitted by the procedure shown in FIG. 12.

When the facsimile mail system 1 receives an incoming call from the terminal via a predetermined address among the line networks L1 to Ln, the facsimile mail system 1 transmits a summary of an operational manual. A description will now be given of the operation with reference to FIG. 12. When the (ISDN) terminal transmits an outgoing call to the facsimile mail system 1 via a predetermined called party number and a predetermined called party subaddress included in the SETUP, the facsimile mail system 1 receives the incoming call and transmits a message to the ISDN terminal, "Please push a start button. We're going to transmit summary of service functions". If the operator of the terminal pushes the start button of the terminal in response to it, the facsimile mail system 1 transmits a summary of service functions thereto. Incidentally, a dial-in function of the ISDN may be used. Thus, according to the present invention, The subaddress or the dial-in is used for designating a service function. The operator of the ISDN terminal can receive a summary of the operational manual shown in FIG. 13. The summary of the operational manual comprises the items of how to perform general service functions and how to perform other service functions. However, the summary of the operational manual may be comprise the items of table of contents and how to obtain a service function.

Further, the present invention is not limited to these embodiments, and variations and modifications may be made without departing from the scope of the present invention.

What is claims is:

1. An apparatus for producing an operational manual of an integrated services digital network (ISDN) terminal and for supplying the operational manual to an operator of the ISDN terminal, said apparatus comprising:

a) communication means for controlling communications between said apparatus and the ISDN terminal by means of predetermined protocol information transmitted between the ISDN terminal and said apparatus, the ISDN terminal and the apparatus being coupled via the ISDN;

b) first memory means for storing a help information item for each minimum procedure of minimum procedures which can no longer be segmented, each help information item indicating how to operate a corresponding minimum procedure;

c) second memory means for storing operations which are input to the ISDN terminal by the operator;

d) detecting means, coupled to said second memory means, for performing an analysis of the operations stored in the second memory means and for detecting a predetermined function desired by the operator based on said analysis of the operations; and e) means, coupled to said first memory means and to said detecting means, for producing the operational manual by:

i) determining a plurality of minimum procedures based on the predetermined function detected by said detecting means, ii) determining help information items in the first memory means corresponding to said plurality of minimum procedures, and iii) reading out addresses of said help information items in said first memory means corresponding to said plurality of minimum procedures, wherein said communications means supplies the operational manual, including said help information items in said first memory means corresponding to said plurality of minimum procedures, to the operator of the ISDN terminal;

wherein said apparatus and the ISDN terminal are each connected to a data channel (B-channel) and a signal channel (D-channel), said communication means comprises a D-channel control means for controlling the connection between the ISDN terminal and said apparatus by means of predetermined protocol information transmitted through the D-channel, the predetermined protocol information including identification information of said apparatus and the ISDN terminal, and the operational manual is supplied to the operator of the ISDN terminal if said communication means receives predetermined identification information from the ISDN terminal.

2. An apparatus according to claim 1, wherein the identification information comprises the items of a calling party number, a called party number, a calling party subaddress and a called party subaddress.

3. An apparatus according to claim 1, wherein the identification information comprises the items of a dial-in calling party number and a called party number.

4. An apparatus according to claim 1, wherein the detecting means automatically performs an analysis of the operations stored in the second memory means.

5. An apparatus according to claim 4, wherein the detecting means automatically determines a predetermined function desired by the operator based on said analysis of the operations stored in the second memory means.

6. An apparatus according to claim 1, wherein said help information items in said first memory means corresponding to said plurality of minimum procedures comprise a set of help information items in said first memory means and wherein said set of said help information items in said first memory means are combined to produce the operational manual.

7. An apparatus according to claim 6, wherein said operational manual is composed of an optimal one of various combinations of said help information items corresponding to said plurality of minimum procedures in said set of help information items which is appropriate for guiding the operator in the function detected by said detecting means based on said analysis of the operations so that the number of minimum procedures in the operation manual can be set to the minimum number possible.

8. An apparatus according to claim 1, wherein said means for producing the operational manual comprises an edit controller and a buffer memory and wherein said edit controller produces said operational manual by storing a code of each minimum procedure of said plurality of minimum procedures and said help information items in said first memory means corresponding to said plurality of minimum procedures in said buffer memory.

9. A method of producing an operational manual supplied to the user of a communications terminal, said method comprising the steps of:

storing, in a memory, help information items for each minimum procedure of said communications terminal which can no longer be segmented, each help information item indicating how to execute a corresponding minimum procedure;

detecting inputs of said user;

analyzing said user inputs to determine a predetermined function desired by the user;

determining a plurality of minimum procedures based on the predetermined function;

determining help information items in the memory corresponding to said plurality of minimum procedures; and reading out addresses of said help information items in said memory corresponding to said plurality of minimum procedures;

wherein the communications terminal comprises an ISDN terminal, the operational manual is produced separately from the ISDN terminal and supplied to the ISDN terminal, in response to predetermined identification information received from the ISDN terminal, by means of predetermined protocol information transmitted through the D-channel of the ISDN, the predetermined protocol information including identification information of said ISDN terminal.

10. A method according to claim 9, wherein the step of analyzing said user inputs to determine a predetermined function desired by the user is performed automatically.

11. A method according to claim 10, wherein the step of determining a plurality of minimum procedures based on the predetermined function is performed automatically.

12. A method according to claim 9, wherein said help information items corresponding to said plurality of minimum procedures comprise a set of help information items and wherein said method comprises the further step of combining said set of help information of items to produce the operational manual.

* * * * *